(12) United States Patent
Sasano et al.

(10) Patent No.: US 6,893,081 B2
(45) Date of Patent: May 17, 2005

(54) VEHICLE FRONT END STRUCTURE

(75) Inventors: Norihisa Sasano, Ama-gun (JP); Toshiharu Nagai, Ikeda (JP)

(73) Assignees: Denso Corporation, Kariya (JP); Daihatsu Motor Co., Ltd., Osaka (JP)

( * ) Notice: Subject to any disclaimer, the term of this patent is extended or adjusted under 35 U.S.C. 154(b) by 0 days.

(21) Appl. No.: 10/373,337

(22) Filed: Feb. 24, 2003

(65) Prior Publication Data

US 2003/0160477 A1 Aug. 28, 2003

(30) Foreign Application Priority Data

Feb. 26, 2002 (JP) ........................................ 2002-049970

(51) Int. Cl.[7] .......................... B60K 11/04; B62D 21/02
(52) U.S. Cl. ............................ 296/203.02; 296/193.09; 296/193.1
(58) Field of Search ................. 296/193.04, 193.09, 296/193.1, 203.02, 29, 187.09; 180/68.4

(56) References Cited

U.S. PATENT DOCUMENTS

| | | | | |
|---|---|---|---|---|
| 3,875,661 | A | * | 4/1975 | Lidstrom et al. .......... 296/191 |
| 6,293,615 | B1 | * | 9/2001 | Tarahomi ............... 296/193.09 |
| 6,357,821 | B1 | * | 3/2002 | Maj et al. .............. 296/193.09 |
| 6,364,403 | B1 | * | 4/2002 | Ozawa et al. ........... 296/187.09 |
| 6,502,653 | B1 | * | 1/2003 | Balzer et al. ............... 180/68.4 |
| 6,516,906 | B2 | * | 2/2003 | Sasano et al. ............. 180/68.4 |
| 6,523,886 | B2 | * | 2/2003 | Hoffner et al. ......... 296/203.02 |
| 6,540,284 | B2 | * | 4/2003 | Miyata .................. 296/203.02 |
| 6,547,317 | B1 | * | 4/2003 | Cheron et al. ......... 296/193.01 |
| 6,598,924 | B2 | * | 7/2003 | Palmer et al. ................ 296/29 |

FOREIGN PATENT DOCUMENTS

JP          11-348693         12/1999

* cited by examiner

Primary Examiner—D. Glenn Dayoan
Assistant Examiner—Greg Blankenship
(74) Attorney, Agent, or Firm—Harness, Dickey & Pierce, PLC

(57) ABSTRACT

Protrusions are provided in a front end panel, and holes in which the protrusions are fitted are provided in a front fender in a vehicle body. Accordingly, when the front end panel is secured to the vehicle body, the protrusions are fitted in the holes so that the front end panel is provisionally positioned relative to the vehicle body, and is completely secured by fastening bolts thereafter. Therefore, the front end panel can be easily secured to the vehicle body while being positioned to the latter, without providing the main reference hole or the sub-reference hole in the front end panel or without preparing a special tool to hold the front end panel while the front end panel is positioned relative to the vehicle body, prior to tightening the bolts.

5 Claims, 2 Drawing Sheets

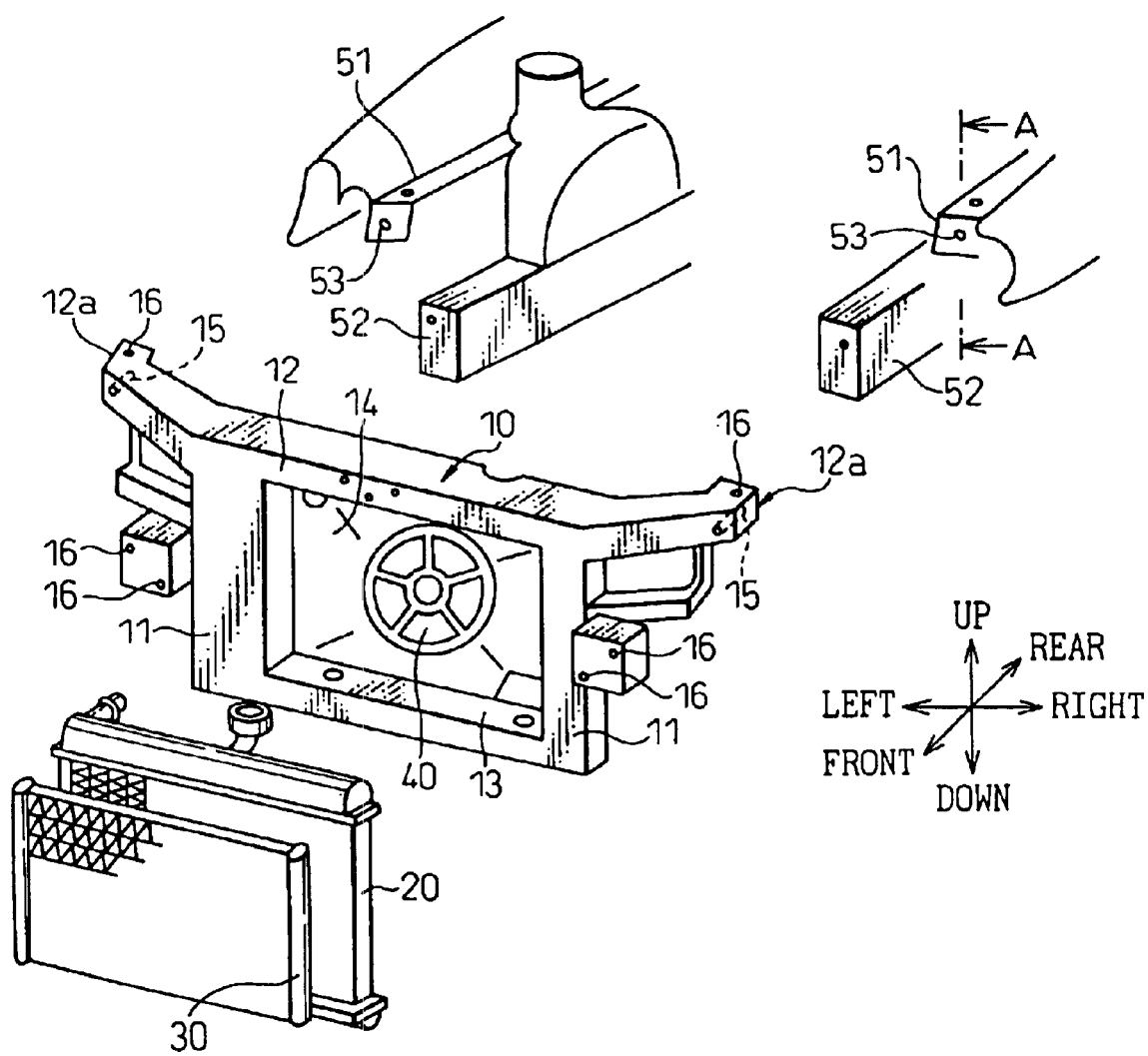

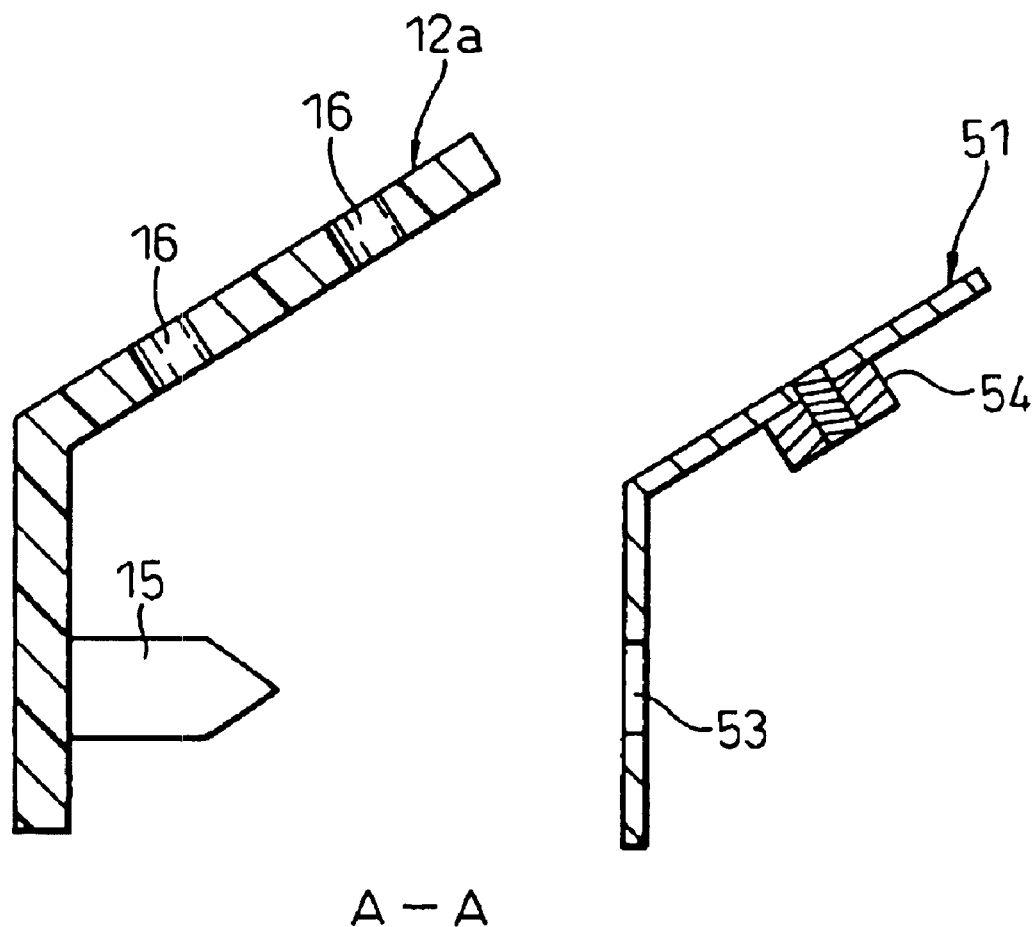

VEHICLE FRONT END STRUCTURE

BACKGROUND OF THE INVENTION

1. Field of the Invention

The present invention relates to a structure for assembling a front end panel to a vehicle body in a front end structure of a vehicle.

2. Description of the Related Art

In general, a front end panel is secured to a vehicle body by bolts. The means described below have been adopted in order to absorb irregularities in size, upon manufacturing, of the front end panel and the vehicle body so as to secure the front end panel to the vehicle body at an appropriate relative position.

Namely, plural kinds of insertion holes, including a main reference hole in which a bolt is firstly inserted, a sub-reference hole in which a bolt is secondarily inserted and a loose-fit hole in which a bolt is inserted while absorbing a positional deviation, are provided in the front end panel, and the sequence of insertion of the bolts is strictly controlled.

The main reference hole has a diameter substantially identical to that of a bolt. The sub-reference hole is shaped like a slot to absorb irregularities in a vertical direction or a horizontal direction. The loose-fit hole has a diameter that is smaller than that of a bolt head and is sufficiently larger than that of the bolt, and the loose-fit hole is not used for positioning the bolt. Therefore, it is difficult to reduce a manufacturing cost of the front end panel because it is necessary to provide plural kinds of bolt holes in the front end panel.

Contrary to this, if all bolt-holes are replaced with loose-fit holes, it is possible to reduce the manufacturing cost of the front end panel. However, because a special tool is needed to hold the front end panel while the front end panel is positioned relative to the vehicle body, prior to the tightening of the bolts, the cost of equipment increases.

SUMMARY OF THE INVENTION

In view of the above problems, the purpose of the present invention is to easily secure the front end panel, while positioning the same, relative to the vehicle body.

To achieve the above object, according to a first aspect of the present invention, there is provided a front end structure of a vehicle having a front end panel (10) to which at least a radiator (20) is mounted, said front end panel being secured to a vehicle body (51), wherein one of the vehicle body (51) and the front end panel (10) has protrusions (15) projecting toward the other, and the other has holes (53) in which the protrusions (15) are fitted.

Accordingly, when the front end panel (10) is secured to the vehicle body, the protrusions (15) are fitted in the holes (53) so that the front end panel (10) can be provisionally positioned relative to the vehicle body, and can be completely secured thereafter.

Therefore, the front end panel (10) can be easily secured to the vehicle body while being positioned relative to the latter, without providing the main reference hole or the sub-reference hole in the front end panel (10) or without preparing a special tool to hold the front end panel (10) while the front end panel (10) is positioned relative to the vehicle body, prior to tightening of the bolts.

In a second aspect of the present invention, the protrusions (15) are made integral with the front end panel (10) when the front end panel (10) is formed, and the holes (53) are provided in a front fender (51) of the vehicle body.

Accordingly, positioning can be carried out with high accuracy because the positioning is carried out with respect to the front fender (51) having a relatively high dimensional accuracy.

As in a third aspect of the present invention, the front end panel (10) and the vehicle body (51) may be secured to each other by fastening bolts.

The numerical references attached in parentheses to the component names described above are given to show an example of correspondence to specific components of embodiments to be described later.

The present invention may be more fully understood from the description of preferred embodiments of the invention set forth below, together with the accompanying drawings.

BRIEF DESCRIPTION OF THE DRAWINGS

In the drawings:

FIG. 1 is an exploded perspective view of a front end structure according to an embodiment of the present invention; and FIG. 2 is a sectional view taken along the line A—A in FIG. 1.

DESCRIPTION OF PREFERRED EMBODIMENTS

FIG. 1 is an exploded perspective view of a front end structure according to the present embodiment, and FIG. 2 is a sectional view taken along the line A—A in FIG. 1.

In FIG. 1, the front end panel 10 is composed of columnar portions 11 that extend in a vertical direction, an upper beam portion 12 that extends in a horizontal direction and that is made integral with the upper ends of the columnar portions 11, and a lower beam portion 13 that extends in a horizontal direction and that is made integral with the lower ends of the columnar portions 11, and the front end panel 10 is shaped as a substantially rectangular frame.

In the present embodiment, the columnar portions 11 and the upper and lower beam portions 12, 13 are made of resin reinforced with carbon fiber and glass fiber, and are integrally molded. It is needless to say that they may be integrally molded by metal-forging such as aluminum die-casting, or may be made integral with one another by welding or by bolts after the columnar portions 11 and the upper and lower beam portions 12, 13 have been independently manufactured.

A radiator 20 for heat-exchange between engine cooling water and air, and a condenser 30 that is an exterior heat-exchanger of an air conditioner, are secured via an elastic member such as vibration proof rubber, at a vehicle front side of the rectangular frame composed of the columnar portions 11 and the upper and lower beam portions 12, 13.

On the other hand, an opening portion 40 is formed at a vehicle rear side of the rectangular frame. A shroud 14 is formed at a vehicle rear side of the opening portion 40 and is made integral with the front end panel 10. The shroud 14 is a cover member that supports an air blower blowing cooling air to the radiator 20 or the like and that prevents a draft induced by the air blower from bypassing the radiator 20 or the like.

The front end panel 10 is secured to the vehicle body by bolts at four positions, i.e., left and right ends of the upper beam portion 12 and substantially middle portions of the columnar portions 11. The left and right ends of the upper beam portion 12 are secured to ends of a front fender 51 of the vehicle body, and the substantially middle portions of the columnar portions 11 are secured to ends of a side member 52 extending, in vehicle front-rear directions, in the vehicle body.

Incidentally, as shown in FIG. 2, pin-like protrusions 15 projecting toward the front fender 51 are formed integral with vehicle securing portions 12a provided in the left and right ends of the upper beam portion 12 during the molding of the front end panel 10. Holes 53 in which the protrusions 15 are fitted are provided in the front fender 51.

When the front end panel 10 is secured to the vehicle body, the protrusions 15 are fitted in the holes 53 so that the front end panel 10 is provisionally positioned relative to the vehicle body, and it is completely secured by fastening bolts thereafter.

A nut 54 having a female thread, in which a male thread of the bolt is engaged, is welded to each of the backs of the end of the front fender 51 to which the front end panel 10 is secured and the end of the side member 52.

The mode of operation and effects of the present embodiment will be described below.

The protrusions 15 are provided in the front end panel 10, and the holes 53 in which the protrusions 15 are fitted are provided in the vehicle body. Therefore, as described above, when the front end panel 10 is secured to the vehicle body, the protrusions 15 are fitted in the holes 53 so that the front end panel 10 can be provisionally positioned relative to the vehicle body, and can be completely secured by fastening bolts thereafter.

Therefore, the front end panel 10 can be easily secured to the vehicle body while being positioned relative to the latter, without providing the main reference hole or the sub-reference hole in the front end panel 10 and without preparing a special tool to hold the front end panel 10 while the front end panel 10 is positioned relative to the vehicle body, prior to tightening of the bolts.

In the present embodiment, all bolt-holes 16 (see FIG. 1) formed in the front end panel 10 have the same diameters as those of the loose-fit holes.

If the front end panel 10 is made of resin, collars of metal or the like are, in general, inserted and embedded into the bolt-holes 16 in order to prevent deformation, over time, due to creep deformation. However, as described above, the number of kinds of collars increases as the number of kinds of bolt-holes increases. Thus, the manufacturing cost of the front end panel 10 increases.

Contrary to this, in the present embodiment, the number of kinds of collars can be reduced because the kinds of bolt-holes can be standardized. Thus, the manufacturing cost of the front end panel 10 can be reduced.

In general, the front fender 51 has a relatively high dimensional accuracy because the front fender 51, among the components of the vehicle body, is located adjacent to decorative parts and is important in terms of a vehicle aesthetic appearance.

Therefore, as in the present embodiment, the protrusions 15 for positioning are provided in the front fender 51, so that the positioning can be carried out with high accuracy.

Another embodiment will be described below. In the above embodiment, the protrusions 15 are provided in the front end panel 10 and the holes 53 are provided in the vehicle body. However, contrary to this, the holes 53 may be provided in the front end panel 10 and the protrusions 15 may be provided in the vehicle body.

In the above embodiment, the protrusions 15 for positioning are provided in the front fender 51. However, the present invention is not limited to this.

Anti-detaching means may be provided in the protrusions 15 by shaping the end portions of the protrusions 15 in the form of a key or stepping the same.

In the above present embodiment, the front end panel 10 and the vehicle body are secured to each other by fastening bolts. However, the present invention is not limited to this. If the front end panel 10 is made of metal, they may be secured by spot welding or the like.

While the invention has been described by reference to specific embodiments chosen for purposes of illustration, it should be apparent that numerous modifications could be made thereto by those skilled in the art without departing from the basic concept and scope of the invention.

What is claimed is:

1. A front end structure of a vehicle having a front end panel to which at least a radiator is mounted, said front end panel being secured to a vehicle body, wherein
    one of the vehicle body and the front end panel has a protrusion projecting from a surface of the one of the vehicle body and the front end panel toward the other and the other has a hole in which the protrusion is fitted;
    said front end panel is secured to a front end of the vehicle body extending in a vehicle front-rear direction;
    a nut is provided on the vehicle body; and
    the protrusion projects in the vehicle front-rear direction and a securing member, by which said front end panel is secured to the front end of the vehicle body, is inserted from above.

2. A front end structure of a vehicle according to claim 1, wherein the protrusion is made integral with the front end panel when the front end panel is formed, and the hole is provided in the vehicle body.

3. A front end structure of a vehicle according to claim 1, wherein the front end panel and the vehicle body are secured to each other by fastening bolts, while the protrusion is fitted in the hole.

4. A front end structure of a vehicle according to claim 1, wherein the vehicle body is a front fender.

5. A front end structure of a vehicle according to claim 1, wherein the protrusion projects generally perpendicular to the surface.

* * * * *